No. 639,671.  
H. DE SMITH.  
GAGE.  
(Application filed Mar. 22, 1899.)  
Patented Dec. 19, 1899.
(No Model.)
*Figure 1.*
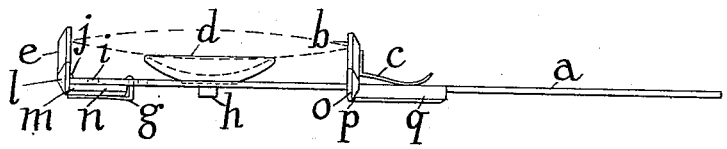
*Fig. 2.*
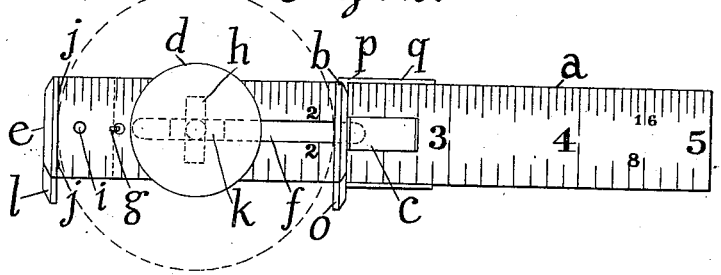
*Fig. 3.*    *Fig. 4.*    *Fig. 5.*    *Fig. 6.*
 
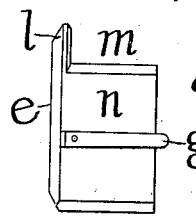
*Fig. 8.*
*Fig. 7.*
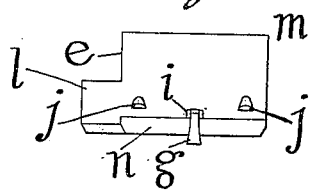
*Fig. 9.*
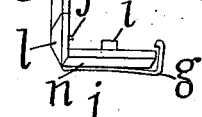
*Fig. 10.*
Witnesses:  
Albert C. Bell,  
Etha M. Smith.
Inventor  
Henry De Smith.  
By his Atty. W. H. Cooley

UNITED STATES PATENT OFFICE.

HENRY DE SMITH, OF ROCHESTER, NEW YORK.

GAGE.

SPECIFICATION forming part of Letters Patent No. 639,671, dated December 19, 1899.

Application filed March 22, 1899. Serial No. 710,015. (No model.)

*To all whom it may concern:*

Be it known that I, HENRY DE SMITH, a citizen of the United States, residing at Rochester, in the county of Monroe and State of New York, have invented an Improved Scale, of which the following is a specification.

My invention has for its object the construction of a scale which may be used for measuring the diameters of lenses or other similar articles and which by the removal of the attachment especially adapted for holding the lenses while they are being gaged or measured can be used as a machinist's calipering gage or scale and which also by the removal of the calipering-slide may be used as a machinist's scale or measure, with an end piece against which one of the surfaces of the object to be measured may be held, so as to come exactly even with the end of the scale. This end piece is readily detachable, and after its removal the scale may then be used as an ordinary machinist's measuring-scale.

The accompanying drawings illustrating my invention are as follows:

Figure 1 is a side view, and Fig. 2 a top view of my scale with its attachments. Fig. 3 is a side view of the lens-cup $d$, similar to that seen in Fig. 1, while Fig. 4 is a side view of such lens-cup $d$, taken at right angles with that seen in Figs. 3 and 1. Figs. 5 and 6 show side views similar to those seen in Figs. 1 and 3 of lens-cups $d'$ and $d^2$ of different sizes and shapes. Figs. 7, 8, 9, and 10 are enlarged views of the end piece $m$ detached from the scale $a$. Fig. 7 is an end view looking at such end piece $m$ from the right as seen in Fig. 1. Fig. 8 is a view of such end piece as seen from the under side; Fig. 9, a view of such end piece similar to that seen in Fig. 1, while Fig. 10 is a top view of such end piece $m$.

Similar letters refer to similar parts throughout the several views.

Referring to the drawings, I have shown a machinist's scale $a$ of substantially the usual construction, except as hereinafter described, in which, as seen in Fig. 2, there is formed a slot $f$ for the insertion of the tongue $k$, formed on the under side of the lens-cup $d$. This tongue $k$ extends into this slot $f$ in the scale $a$ only so far as necessary to prevent the cup $d$ from turning when in place. From the center of this tongue $k$, and preferably integral therewith, there extends downward a short pin or stud carrying a spring $h$, which, as seen, is of such a width that when it lies longitudinally with the slot $f$ it will readily pass through such slot. This lens-cup $d$ is inserted by first inserting the spring $h$ through the slot $f$, at which time the tongue $k$ will lie transversely with the slot $f$. Then by turning the cup $d$ around either to the right or to the left the spring $h$ will be caused to pass beneath the under surface of the scale $a$ on each side of the slot $f$, and when this cup $d$ has been turned around so that the tongue $k$ lies over the slot $f$ and in the same direction therewith this spring $h$ will force the cup $d$ downward, causing the tongue $k$ to enter the slot $f$. The lens-cup $d$ will thus be firmly secured upon the scale $a$ in such a manner as to be capable of longitudinal movement on such scale over a distance determined by the length of the slot $f$, which may be varied according to the size or diameter of the lenses to be gaged.

For the removal of cup $d$ from the scale $a$ the operation just described is reversed—that is, the cup $d$ is slightly raised so as to lift the tongue $k$ out of the slot $f$ and such cup $d$ is then turned around so that the spring $h$ shall lie longitudinally with the slot $f$, when the cup $d$ may be removed.

The end piece $m$, as seen, consists in an angular piece of metal, preferably steel, consisting of a vertical portion $e$ and a horizontal portion $n$, having projecting lugs $j$ formed on the inner surface of its vertical portion $e$ and arranged to come just over the upper surface of the extreme left-hand end of the scale $a$ when in position. A pin or dowel $i$, formed on the horizontal portion $n$ of this end piece $m$, is arranged to enter a suitable hole therefor near the left-hand end of the scale $a$. A spring-latch $g$ on the under side of the horizontal portion $n$ of this end piece $m$ and extending beyond the right-hand end thereof is arranged to pass up through a hole therefor near the left-hand end of the scale $a$ and engage such scale $a$ by means of the catch formed at the top of the right-hand end of this spring $g$. When the end piece $m$ is in position, as seen in Figs. 1 and 2, the lugs $j$ hold the extreme left-hand end of the scale $a$ firmly down against the horizontal portion $n$ of the end piece $m$, the dowel $i$ prevents the transverse or horizontal movement of the scale $a$ upon the end piece $m$, and the square end of this scale coming against the vertical portion $e$ of the end piece $m$ prevents any angular motion of the scale $a$ upon the pin $i$. The spring-catch $g$ holds the horizontal portion $n$ of the end piece $m$ firmly up against the scale $a$, so that this end piece is rigidly secured to the scale $a$ and prevented from in any wise moving thereon until the spring-catch $g$ has been released. When this spring-catch $g$ has been released by forcing the right-hand end thereof to the right and downward by means of the thumb or finger, the end piece $m$ may be readily removed from the scale $a$.

In place of the cup $d$ there may be used others of different sizes and shapes, as seen in Figs. 5 and 6 and lettered $d'$ and $d^2$, respectively, adapted to lenses of different sizes and shapes.

As seen in Figs. 1 and 2, I make use of a calipering-slide $p$ of substantially the usual construction, consisting in a vertical portion $b$ and a horizontal portion $q$, which, by means of a spring $c$, may be held in any desired position upon the scale $a$ longitudinally thereof. On the end piece $m$ is seen a projection $l$ and on the calipering-slide $p$ is noticed a similar projection $o$. By means of these projections $l$ and $o$ the scale $a$ may be used on one of its edges as a calipering-scale. The end piece $m$ and the calipering-slide $p$ constitute such scale a caliper, which may be used not only in calipering-lenses, but it may be put to any other similar use.

When a cup is used in connection with the other parts of the scale for gaging lenses, the lens is placed upon the cup, with the center of the lens as near as may be over the center of the cup $d$. The cup, with the lens thereon, is then moved so as to bring one edge of the lens against the end piece $m$. Then the slide $p$ is moved so as to come against the opposite edge of the lens, when the reading upon the scale upon the left-hand side of the slide $p$ will give the exact diameter of the lens. Figs. 1 and 2 show in dotted outline a lens as being gaged by my scale.

By the removal of the cup $d$ the scale $a$, with the end piece $m$ and the calipering-slide $p$, may be used as a calipering-rule either upon its upper surface or upon one of its edges, as already above described.

By the removal of the cup $d$ and the slide $p$ any object to be measured may be placed either against the vertical portion $e$ of the end piece $m$ or the projection $l$ thereon, but preferably against the projection $l$, and the length thereof or other desired dimension read off upon the scale $a$.

When the scale $a$ is used with the end piece $m$ alone, the end of any object to be measured may be held even with the end of the scale $a$ by being firmly held against the projection $l$ on the vertical portion $e$ of the end piece $m$.

It will at once be noticed that the utility of the scale $a$ for general purposes is in no wise affected by the slight changes required therein in order to adapt it to receive the end piece $m$ and the lens-cup $d$.

What I claim is—

1. In combination with a scale and an end piece therefor, a dowel on one of such members coöperating with a hole in the other to hold such members together against both longitudinal and lateral thrust, with the end of such scale in an angle on such end piece, and a spring-latch operating to clamp such members together so as to hold such dowel in its operative position.

2. In combination with a scale and an end piece arranged to be held thereon by means of a spring-catch, a lug formed on such end piece arranged to engage the end of such scale and firmly hold the same down in an angle formed in such end piece.

3. An end piece for a scale arranged to be attached to such scale by means of a spring-catch coöperating with a dowel arranged to enter a suitable hole therefor in the end of such scale and with lugs formed on such end piece arranged to engage the end of such scale and firmly hold the same down in an angle formed in such end piece.

HENRY DE SMITH.

Witnesses:
WM. H. COOLEY,
ALBERT C. BELL.